United States Patent
Christen

(10) Patent No.: US 11,878,689 B2
(45) Date of Patent: Jan. 23, 2024

(54) VEHICLE REVERSE DRIVE MODE

(71) Applicant: FORD GLOBAL TECHNOLOGIES, LLC, Dearborn, MI (US)

(72) Inventor: Erik J. Christen, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 147 days.

(21) Appl. No.: 17/345,574

(22) Filed: Jun. 11, 2021

(65) Prior Publication Data

US 2022/0396269 A1 Dec. 15, 2022

(51) Int. Cl.
*B60W 30/18* (2012.01)
*B60W 30/095* (2012.01)
*B60W 40/02* (2006.01)
*B60W 10/08* (2006.01)

(52) U.S. Cl.
CPC ...... *B60W 30/18036* (2013.01); *B60W 10/08* (2013.01); *B60W 30/095* (2013.01); *B60W 40/02* (2013.01); *B60W 2510/30* (2013.01); *B60W 2554/4041* (2020.02); *B60W 2555/20* (2020.02); *B60W 2710/083* (2013.01); *B60W 2720/10* (2013.01)

(58) Field of Classification Search
CPC ........... B60W 30/18036; B60W 10/08; B60W 30/095; B60W 40/02; B60W 2554/4041; B60W 2555/20; B60W 2510/30; B60W 2710/083; B60W 2720/10
See application file for complete search history.

(56) References Cited

U.S. PATENT DOCUMENTS

| | | | |
|---|---|---|---|
| 5,635,903 A * | 6/1997 | Koike | B60Q 5/008 340/384.1 |
| 8,457,868 B2 | 6/2013 | Tange et al. | |
| 10,029,685 B1 * | 7/2018 | Hubbard | B60W 30/146 |
| 10,426,675 B1 * | 10/2019 | Erickson | A61G 5/04 |
| 10,814,906 B2 | 10/2020 | Schiebahn et al. | |
| 2003/0205422 A1 * | 11/2003 | Morrow | B60K 17/046 903/910 |
| 2004/0046647 A1 * | 3/2004 | Reeves | B60Q 9/007 340/685 |
| 2009/0066499 A1 * | 3/2009 | Bai | G10K 15/02 340/459 |
| 2010/0201508 A1 * | 8/2010 | Green | B60Q 9/008 340/435 |
| 2013/0297173 A1 * | 11/2013 | Takagi | G01S 13/862 701/70 |

(Continued)

OTHER PUBLICATIONS

Back It Up: the Nissan Leaf Holds a Speed Record, Drivingline, Story by Moghaddam, Apr. 30, 2017, [retrieved on Feb. 2021]. Retrieved from the Internet: < https://www.drivingline.com/articles/back-it-up-the-nissan-leaf- holds-a-speed-record/>.

*Primary Examiner* — Fadey S. Jabr
*Assistant Examiner* — Naeem Taslim Alam
(74) *Attorney, Agent, or Firm* — David B Kelley; Brooks Kushman P.C.

(57) ABSTRACT

A vehicle includes an electric machine that generates torque to move wheels of the vehicle, and a controller. The controller operates the electric machine to limit a maximum speed at which the vehicle is driven in reverse such that the maximum speed depends on a number of detected objects behind the vehicle.

15 Claims, 3 Drawing Sheets

(56) References Cited

U.S. PATENT DOCUMENTS

| | | | |
|---|---|---|---|
| 2015/0197282 A1* | 7/2015 | Hochrein | B62D 15/027 |
| | | | 701/41 |
| 2015/0246676 A1* | 9/2015 | Keren | B60W 30/146 |
| | | | 701/93 |
| 2015/0268665 A1* | 9/2015 | Ludwick | B60Q 5/008 |
| | | | 701/23 |
| 2019/0049242 A1* | 2/2019 | Adams | G01B 21/16 |
| 2019/0232867 A1* | 8/2019 | Bednar | H04R 1/025 |
| 2020/0164844 A1* | 5/2020 | Jung | B60W 40/068 |
| 2020/0291590 A1* | 9/2020 | Fukano | E01H 5/08 |
| 2021/0101595 A1* | 4/2021 | Cheyne | B60W 30/0956 |
| 2021/0357905 A1* | 11/2021 | Branscomb | G06Q 20/3224 |
| 2022/0118905 A1* | 4/2022 | Noh | G10K 11/16 |

\* cited by examiner

VEHICLE REVERSE DRIVE MODE

TECHNICAL FIELD

The present disclosure relates to a method for operating a vehicle in reverse.

BACKGROUND

Many electric vehicles (EVs) use a single speed transmission coupled between an electric motor and wheels. The EVs may drive forward (i.e. in drive mode) when the electric motor rotates in one direction, and drive backward (i.e. in reverse mode) when the electric motor rotates in the other direction. Although the EVs may theoretically drive in reverse at a high rate of speed, many EVs are equipped with a reverse speed limiter.

SUMMARY

A vehicle includes an electric machine that generates torque to move wheels of the vehicle, and a controller that operates the electric machine to limit a maximum speed at which the vehicle is driven in reverse such that the maximum speed depends on a number of detected objects behind the vehicle.

A method includes operating an electric machine to drive a vehicle in reverse, and limiting a maximum speed of the vehicle while being driven in reverse according to a location of the vehicle.

A drivetrain for a vehicle includes a controller that limits a maximum speed at which the vehicle is driven in reverse such that the maximum speed is greater when a siren is on than when the siren is off.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The present disclosure, among other things, proposes a method for operating an electric vehicle in reverse.

Figure 1:
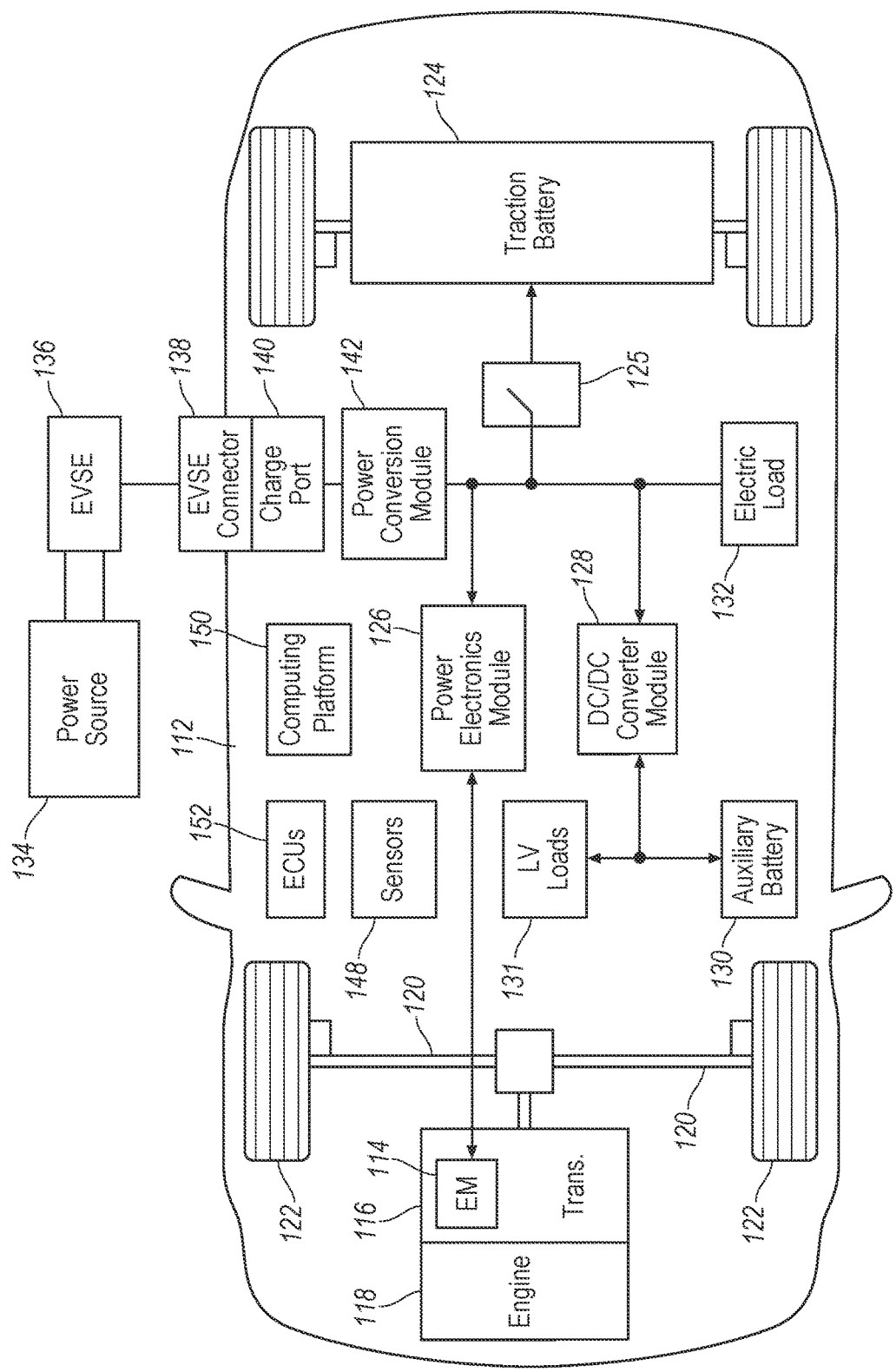
FIG. 1 illustrates an example block topology of an electrified vehicle illustrating drivetrain and energy storage components.

FIG. 1 depicts an electrified vehicle 112 that may be referred to as a plug-in hybrid-electric vehicle (PHEV), a battery electric vehicle (BEV), a mild hybrid-electric vehicle (MHEV), and/or a full hybrid electric vehicle (FHEV). A plug-in hybrid-electric vehicle 112 may comprise one or more electric machines 114 mechanically coupled to a hybrid transmission 116. The electric machines 114 may be capable of operating as a motor or a generator. In addition, the hybrid transmission 116 is mechanically coupled to an engine 118. The hybrid transmission 116 is also mechanically coupled to a drive shaft 120 that is mechanically coupled to the wheels 122. The hybrid transmission may be switchable between one or more forward gear and a reverse gear to allow the vehicle 112 to switch driving direction. In case that the vehicle 112 is a BEV without the engine 118, the transmission 116 may be a single speed transmission mechanically coupled between the electric machines 114 and the drive shaft 120. The vehicle 112 may switch the driving direction by changing the rotation direction of the electric machine 114. In other words, the vehicle 112 may drive in a forward direction when the electric machine 114 rotates in one direction, and drive in reverse direction when the electric machine 114 rotates in another direction. The electric machines 114 can provide propulsion and braking capability when the engine 118 is turned on or off. The electric machines 114 may also act as generators and can provide fuel economy benefits by recovering energy that would normally be lost as heat in a friction braking system. The electric machines 114 may also reduce vehicle emissions by allowing the engine 118 to operate at more efficient speeds and allowing the hybrid-electric vehicle 112 to be operated in electric mode with the engine 118 off under certain conditions.

A traction battery or battery pack 124 may store energy that can be used by the electric machines 114. The vehicle battery pack 124 may provide a high voltage direct current (DC) output. The traction battery 124 may be electrically coupled to one or more power electronics modules 126 (such as a traction inverter). One or more contactors 125 may isolate the traction battery 124 from other components when opened and connect the traction battery 124 to other components when closed. The power electronics module 126 is also electrically coupled to the electric machines 114 and provides the ability to bi-directionally transfer energy between the traction battery 124 and the electric machines 114. For example, a traction battery 124 may provide a DC voltage while the electric machines 114 may operate with a three-phase alternating current (AC) to function. The power electronics module 126 may convert the DC voltage to a three-phase AC current to operate the electric machines 114. In a regenerative mode, the power electronics module 126 may convert the three-phase AC current from the electric machines 114 acting as generators to DC voltage compatible with the traction battery 124.

The vehicle 112 may include a variable-voltage converter (VVC) (not shown) electrically coupled between the traction battery 124 and the power electronics module 126. The VVC may be a DC/DC boost converter configured to increase or boost the voltage provided by the traction battery 124. By increasing the voltage, current requirements may be decreased leading to a reduction in wiring size for the power electronics module 126 and the electric machines 114. Further, the electric machines 114 may be operated with better efficiency and lower losses.

In addition to providing energy for propulsion, the traction battery 124 may provide energy for other vehicle electrical systems. The vehicle 112 may include a DC/DC converter module 128 that converts the high voltage DC output of the traction battery 124 to a low voltage DC supply that is compatible with low-voltage vehicle loads. An output of the DC/DC converter module 128 may be electrically coupled to an auxiliary battery 130 (e.g., 12V battery) for charging the auxiliary battery 130. The low-voltage systems having one or more low-voltage loads 131 that may be electrically coupled to the auxiliary battery 130. One or more electrical loads 132 may be coupled to the high-voltage bus/rail. The electrical loads 132 may have an associated controller that operates and controls the electrical loads 146 when appropriate. Examples of electrical loads 132 may be a fan, an electric heating element, and/or an air-conditioning compressor.

The electrified vehicle 112 may be configured to recharge the traction battery 124 from an external power source 134. The external power source 134 may be a connection to an electrical outlet. The external power source 134 may be electrically coupled to a charger or electric vehicle supply equipment (EVSE) 136. The external power source 134 may be an electrical power distribution network or grid as provided by an electric utility company. The EVSE 136 may provide circuitry and controls to regulate and manage the transfer of energy between the power source 134 and the vehicle 112. The external power source 134 may provide DC or AC electric power to the EVSE 136. The EVSE 136 may have a charge connector 138 for plugging into a charge port 140 of the vehicle 112. The charge port 140 may be any type of port configured to transfer power from the EVSE 136 to the vehicle 112. The charge port 140 may be electrically coupled to a charger or on-board power conversion module 142. The power conversion module 142 may condition the power supplied from the EVSE 136 to provide the proper voltage and current levels to the traction battery 124. The power conversion module 142 may interface with the EVSE 136 to coordinate the delivery of power to the vehicle 112. The EVSE connector 138 may have pins that mate with corresponding recesses of the charge port 140. Alternatively, various components described as being electrically coupled or connected may transfer power using a wireless inductive coupling.

The vehicle 112 may be provided with various sensors 148 to perform various measurements. As a few non-limiting examples, the sensors 148 may include a radar (e.g. ultrasonic sensor) or Lidar sensor configured to detect a surrounding environment near the vehicle. The sensors 148 may further include one or more cameras configured to capture images from the vehicle 112. The cameras 148 may include a front view camera configured to a front view image of the vehicle 112 and rear view camera configured to capture a review image of the vehicle 112. The cameras 148 may further include a surrounding view camera system configured to capture a surrounding view image of the vehicle 112. Signals from the sensors 148 may be used by the vehicle 112 to enable driving assistant features such as lane keep assist, parking assist or the like. The sensor data may be transmitted to a computing platform 150 and/or one or more electronic control units (ECUs) 152 for processing and analysis (to be discussed in detail below).

Figure 2:
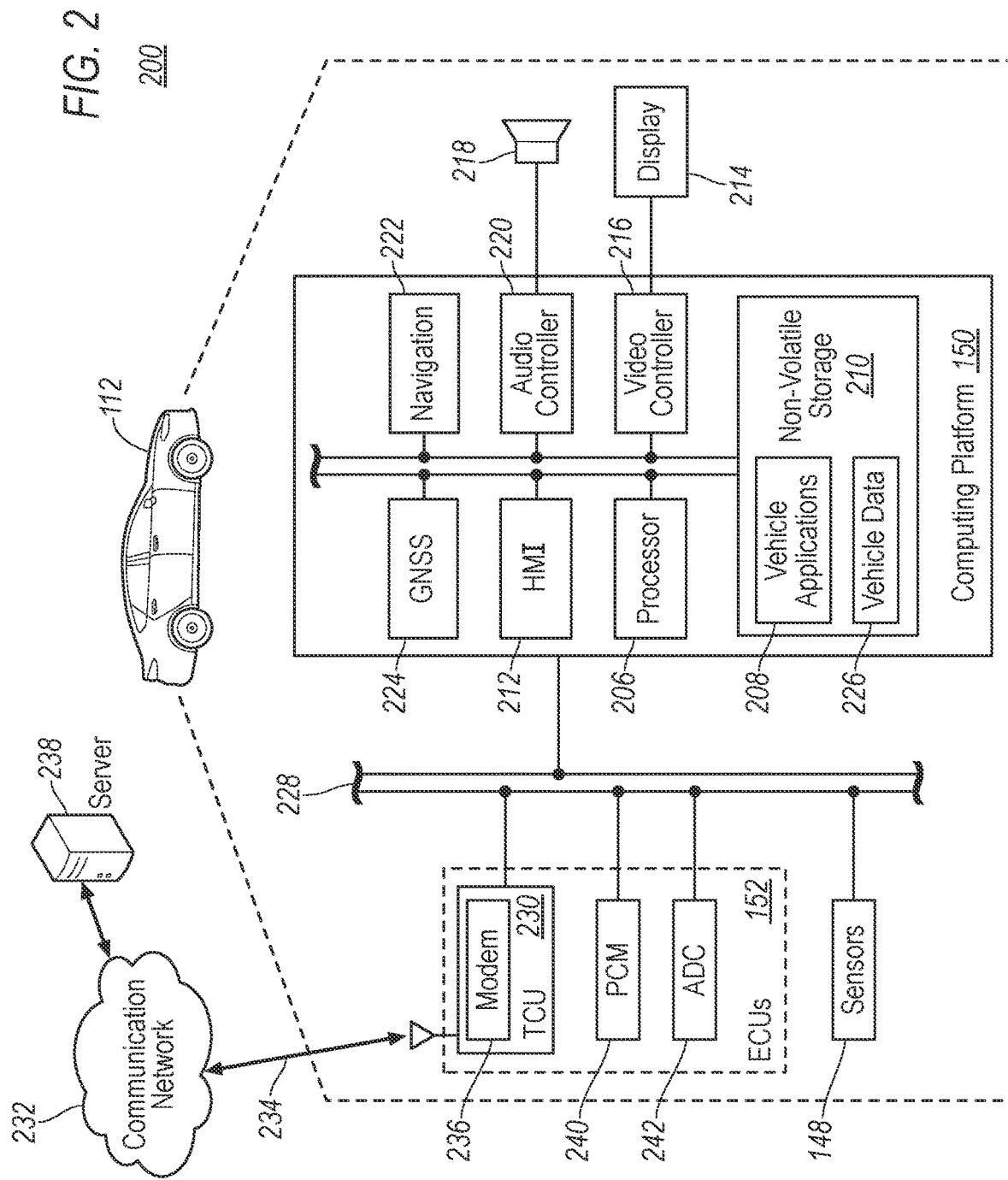
FIG. 2 illustrates an example diagram of a system controller and a battery electric control module.

Referring to FIG. 2, an example block topology of a vehicle system 200 of one embodiment of the present disclosure is illustrated. As an example, the system 200 may include the SYNC system manufactured by The Ford Motor Company of Dearborn, Michigan. It should be noted that the illustrated system 200 is merely an example, and more, fewer, and/or differently located elements may be used.

As illustrated in FIG. 2, the computing platform 150 may include one or more processors 206 configured to perform instructions, commands, and other routines in support of the processes described herein. For instance, the computing platform 150 may be configured to execute instructions of vehicle applications 208 to provide features such as navigation, remote controls, and wireless communications. Such instructions and other data may be maintained in a non-volatile manner using a variety of types of computer-readable storage medium 210. The computer-readable medium 210 (also referred to as a processor-readable medium or storage) includes any non-transitory medium (e.g., tangible medium) that participates in providing instructions or other data that may be read by the processor 206 of the computing platform 150. Computer-executable instructions may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

The computing platform 150 may be provided with various features allowing the vehicle occupants/users to interface with the computing platform 150. For example, the computing platform 150 may receive input from HMI controls 212 configured to provide for occupant interaction with the vehicle 112. As an example, the computing platform 150 may interface with one or more buttons, switches, knobs, or other HMI controls configured to invoke functions on the computing platform 150 (e.g., steering wheel buttons, a push-to-talk button, instrument panel controls, etc.).

The computing platform 150 may also drive or otherwise communicate with one or more displays 214 configured to provide visual output to vehicle occupants by way of a video controller 216. In some cases, the display 214 may be a touch screen further configured to receive user touch input via the video controller 216, while in other cases the display 214 may be a display only, without touch input capabilities. As a few non-limiting examples, the display 214 may be implemented as a liquid crystal display (LCD) screen mounted on the dashboard inside the vehicle 112. The computing platform 150 may also drive or otherwise communicate with one or more speakers 218 configured to provide audio output and input to vehicle occupants by way of an audio controller 220.

The computing platform 150 may also be provided with navigation and route planning features through a navigation controller 222 configured to calculate navigation routes responsive to user input via, for example, the HMI controls 212, and output planned routes and instructions via the speaker 218 and the display 214. Location data that is needed for navigation may be collected from a global navigation satellite system (GNSS) controller 224 configured to communicate with multiple satellites and calculate the location of the vehicle 112. The GNSS controller 224 may be configured to support various current and/or future global or regional location systems such as global positioning system (GPS), Galileo, Beidou, Global Navigation Satellite System (GLONASS) and the like. Map data used for route planning may be stored in the storage 210 as a part of the vehicle data 226. Navigation software may be stored in the storage 210 as one of the vehicle applications 208.

The computing platform 150 may be further configured to communicate with various components of the vehicle 112 via one or more in-vehicle networks 228. The in-vehicle network 228 may include, but is not limited to, one or more of a controller area network (CAN), an Ethernet network, and a media-oriented system transport (MOST), as some examples. Furthermore, the in-vehicle network 228, or portions of the in-vehicle network 228, may be a wireless network accomplished via Bluetooth low-energy (BLE), Wi-Fi, UWB, or the like.

The computing platform 150 may be configured to communicate with various electronic control units (ECUs) 152 of the vehicle 112 configured to perform various operations. For instance, the ECUs 152 may include a telematics control unit (TCU) 230 configured to control telecommunication between vehicle 112 and a communication network 232 through a wireless connection 234 using a modem 236. The wireless connection 234 may be in the form of various communication networks, for example, a cellular network. Through the communication network 232, the vehicle may access one or more servers 238 to access various content for various purposes. It is noted that the terms communication network and server are used as general terms in the present disclosure and may include any computing network involving carriers, routers, computers, controllers, circuitry or the like configured to store data and perform data processing functions and facilitate communication between various entities.

The ECUs 152 may further include a powertrain control module (PCM) 240 configured to operate the drivetrain of the vehicle 112. In the driving mode, the PCM 240 may monitor vehicle status data such as the speed and operate the engine 118, electric machine 116 and vehicle transmission 114 to adapt to various driving needs. In the regenerative mode, the PCM 240 may operate the electric machine 114 operating as a generator to convert the AC current generated by the vehicle motion to DC voltage compatible with the traction battery 124. The PCM 240 may be further configured to impose a reverse speed limiter to the drivetrain to limit a maximum speed the vehicle 112 may operate in reverse (e.g. 20 mph). The reverse speed limiter operated by the PCM 240 may be temporarily disabled or lessened responsive to a user input via the HMI controls 212 (to be discussed in detail below). The ECUs 152 may further include an autonomous driving controller (ADC) 242 configured to monitor and operate autonomous driving and driving assistant features of the vehicle 112. For instance, the ADC 242 may be configured to operate a lane keep assist feature in reverse using sensor data from the sensors 148. The lane keep assist feature in reverse may be particularly useful when the reverse speed limiter is disabled or lessened and the vehicle 112 travels in a backward direction at a high rate of speed.

Figure 3:
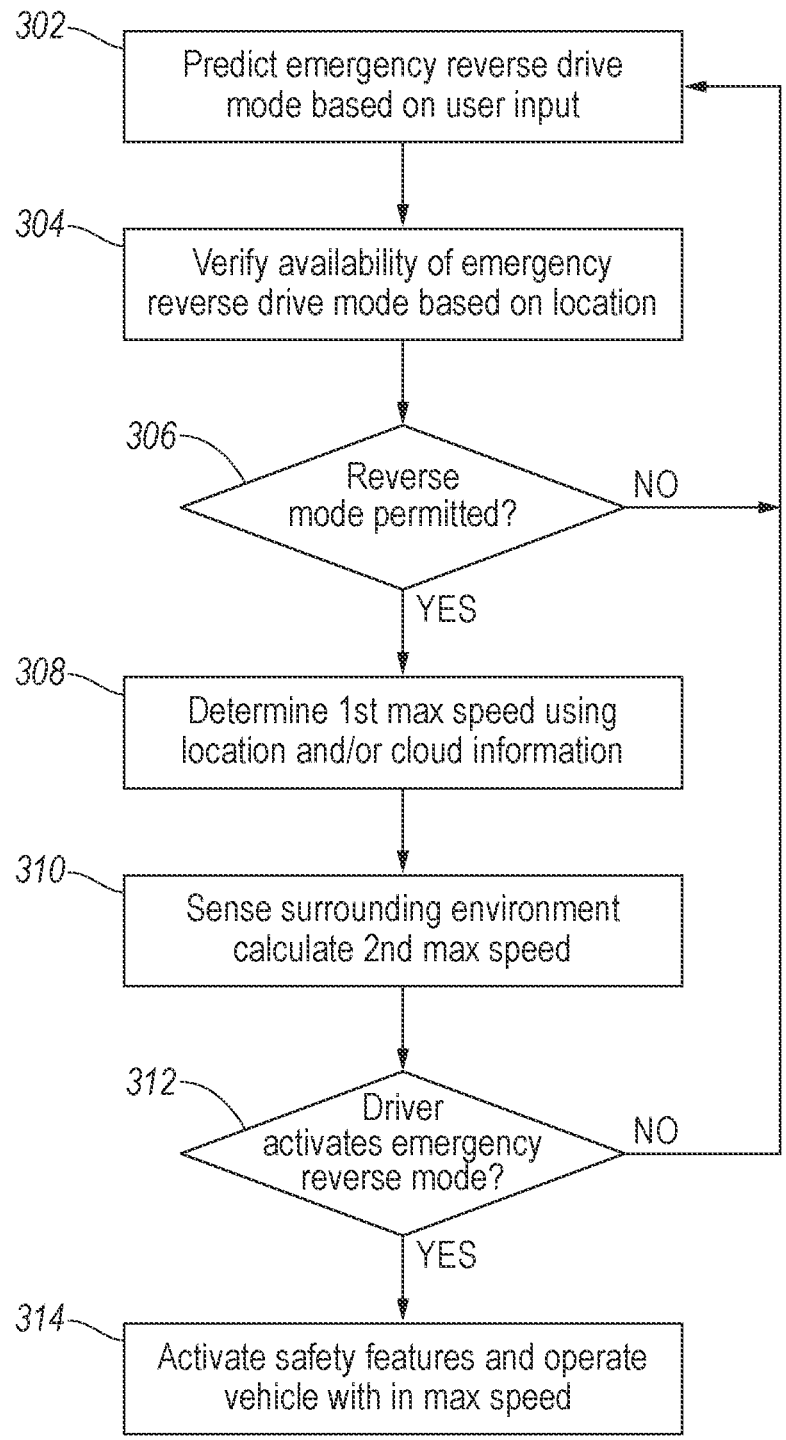
FIG. 3 illustrates an example flow diagram of a process for activating the reverse drive mode.

Referring to FIG. 3, an example flow diagram of process 300 for the special reverse drive mode is illustrated. With continuing reference to FIGS. 1 and 2, process 300 may be implemented via the computing platform 150 in combination with other components of the vehicle 112. In general, the special reverse drive mode allows the user to temporarily disable or lessen the involvement of the reverse speed limiter such that the vehicle 112 may operate in reverse at a high rate of speed. At operation 302, responsive to predicting the special reverse drive mode is to be used, the process proceeds to operation 304 and the computing platform 150 verifies if the special reverse drive mode is available based on the location of the vehicle 112. The prediction of the special reverse drive mode may be triggered responsive to a user input to the vehicle 112. For instance, in case that the vehicle 112 is an emergency vehicle (e.g. a police vehicle), 302 may be triggered by a user input activating the emergency light and/or siren. Responsive to the trigger, the computing platform 150 obtains a current vehicle location via the GNSS controller 224 and verifies the location against a database stored in the storage 210 as a part of the vehicle data 226 to determine if the special reverse drive mode is available/permitted at the current location. The special reverse drive mode (i.e. disabling or lessening the reverse speed limiter) may be prohibited or restricted within certain geofences such as school zone, busy business district or the like. Since the vehicle may be in motion when the prediction is triggered at operation 302, the computing platform 150 may be further configured to predict a location at which the special reverse drive mode will be activated via the navigation controller 222 and determine the availability of the special reverse drive mode using the predicted location. Additionally or alternatively, the computing platform 150 may use a remote database located at the cloud server 238 to verify if the special reverse drive mode is available in addition to or in lieu of the database 226 stored in the storage 210.

If the computing platform 150 determines that the special reverse drive mode is not permitted based on the vehicle location, the process returns to operation 302. Otherwise, if the computing platform 150 verifies that the special reverse drive mode is permitted, the process proceeds to operation 308 and the computing platform 150 further determines a first maximum speed in reverse at the vehicle location (current or predicted) via the database at the storage 210 and/or the cloud server 238. The first maximum speed may be a general speed limit in reverse imposed on the vehicle 112 based on geofence. For instance, a 60 mph maximum speed in reverse may be imposed on the vehicle 112 in the city whereas there is no maximum speed in reverse in the countryside. The first general maximum speed may be further dependent on traffic condition, weather and real-time events received from the server 238. For instance, the computing platform 150 may reduce the first general maximum speed in the city from 60 mph to 40 mph responsive to detecting a temporary construction work zone and/or detecting a raining weather condition in the area. At operation 310, the computing platform 150 activates sensors 148 and starts to measure a surrounding condition near the vehicle 112, and determines a second maximum speed in reverse specific to the condition near the vehicle 112. While the first general maximum speed based on the geofence may reflect the general conditions for the vehicle location, the second maximum speed determined by the vehicle using sensor data may reflect more specific conditions near the vehicle 112 such that the vehicle 112 may operate in reverse in a safely manner. As an example, the sensors (e.g. camera, lidar or the like) 148 may measure and detect objects behind the vehicle 112 and adjust the maximum speed accordingly. As an example, the computing platform 150 may determine the second specific maximum speed in reverse is 80 mph on a widely open road with few objects detected near the vehicle (e.g., a rural area) as compared to 30 mph in a narrow street with multiple objects behind the vehicle being detected (e.g., a city). The final speed limit in reverse will be determined as the lower of the first and second maximum speeds discussed above. At operation 312, responsive to detecting user input activating the special reverse drive mode, the process proceeds to operation 314 and the PCM 240 disables or lessens the reverse speed limiter and operates the vehicle in reverse within the speed limit assisted by safety features operated by the ADC 242. The vehicle 112 may be configured to enter the special reverse drive mode responsive to receiving a predefined user input such as pressing a button after shifting to reverse gear. The computing platform 150 may provide visual and/or audio feedback confirming the activation of the special reverse drive mode. The computing platform 150 may further output the speed limit in reverse to the drive via the HMI controller 212. While operating in the special reverse drive mode, the ADC 242 may provide autonomous driving assistance to the driving such that the vehicle 112 may drive in reverse at high rate of speed. For instance, the ACD 242 may activate a reverse lane keep assist feature using data captured via the sensors 148 while in the special reverse drive mode. The ADC 242 may further apply automatic braking responsive to detecting an object behind the vehicle to avoid colliding with the object. The ADC 242 may further apply automatic steering such that the vehicle 112 may maneuver around objects in an autonomous driving manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as Read Only Memory (ROM) devices and information alterably stored on writeable storage media such as floppy disks, magnetic tapes, Compact Discs (CDs), Random Access Memory (RAM) devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure.

As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   a siren;
   an electric machine configured to generate torque to move wheels of the vehicle; and
   a controller programmed to
      operate the electric machine to limit a maximum speed at which the vehicle is driven in reverse such that the maximum speed depends on a number of detected objects behind the vehicle, and
      responsive to detecting input to turn on the siren, increase the maximum speed.

2. The vehicle of claim 1, wherein the controller is further programmed to operate the electric machine to limit the maximum speed such that the maximum speed depends on a location of the vehicle.

3. The vehicle of claim 2, wherein the maximum speed is greater in rural areas than in cities.

4. The vehicle of claim 1 further comprising an emergency light, wherein the controller is further configured to operate the electric machine to limit the maximum speed such that the maximum speed is greater when the emergency light is on than when the emergency light is off.

5. The vehicle of claim 1 wherein the controller is further configured to operate the electric machine to limit the maximum speed such that the maximum speed depends on weather in a vicinity of the vehicle.

6. The vehicle of claim 5, wherein the maximum speed is greater in an absence of rain than in a presence of rain.

7. A method comprising:
   operating an electric machine to drive a vehicle in reverse;
   limiting a maximum speed of the vehicle while being driven in reverse according to a location of the vehicle; and
   responsive to detecting input to turn on an emergency light, increasing the maximum speed.

8. The method of claim 7, wherein the maximum speed is greater in rural areas than in cities.

9. The method of claim 7 further comprising limiting the maximum speed according to a number of detected objects behind the vehicle.

10. The method of claim 9, wherein the maximum speed increases as the number decreases.

11. The method of claim 7 further comprising limiting the maximum speed according to whether a siren is on.

12. The method of claim 7 further comprising limiting the maximum speed according to whether rain is in a vicinity of the vehicle.

13. A drivetrain for a vehicle comprising:
   a controller programmed to limit a maximum speed at which the vehicle is driven in reverse such that the maximum speed is greater when a siren or emergency light is on than when the siren or emergency light is off, and responsive to detecting an input to turn on the siren or emergency light, increase the maximum speed.

14. The drivetrain of claim 13, wherein the controller is further programmed to limit the maximum speed according to a number of detected objects behind the vehicle.

15. The drivetrain of claim 14, wherein the maximum speed increases as the number decreases.

* * * * *